(12) United States Patent
Sikka et al.

(10) Patent No.: US 11,392,667 B2
(45) Date of Patent: Jul. 19, 2022

(54) SYSTEMS AND METHODS FOR AN INTELLIGENT MAPPING OF NEURAL NETWORK WEIGHTS AND INPUT DATA TO AN ARRAY OF PROCESSING CORES OF AN INTEGRATED CIRCUIT

(71) Applicant: quadric.io, Inc., Burlingame, CA (US)

(72) Inventors: Aman Sikka, Burlingame, CA (US); Nigel Drego, Burlingame, CA (US); Daniel Firu, Burlingame, CA (US); Veerbhan Kheterpal, Burlingame, CA (US)

(73) Assignee: quadric.io, Inc., Burlingame, CA (US)

( * ) Notice: Subject to any disclaimer, the term of this patent is extended or adjusted under 35 U.S.C. 154(b) by 0 days.

(21) Appl. No.: 17/556,828

(22) Filed: Dec. 20, 2021

(65) Prior Publication Data

US 2022/0197971 A1   Jun. 23, 2022

Related U.S. Application Data

(60) Provisional application No. 63/127,906, filed on Dec. 18, 2020.

(51) Int. Cl.
*G06F 17/14* (2006.01)
*G06F 17/16* (2006.01)

(52) U.S. Cl.
CPC ............ *G06F 17/142* (2013.01); *G06F 17/16* (2013.01)

(58) Field of Classification Search
CPC ............................... G06F 14/142; G06F 17/16
USPC .................................................. 708/400–409
See application file for complete search history.

(56) References Cited

U.S. PATENT DOCUMENTS

| | | | |
|---|---|---|---|
| 8,990,280 B2 * | 3/2015 | Sriram | G06F 17/147 708/607 |
| 10,365,860 B1 * | 7/2019 | Drego | G06F 3/0688 |
| 10,691,464 B1 * | 6/2020 | Drego | G06F 15/8023 |
| 10,997,115 B2 * | 5/2021 | Drego | G06F 15/16 |

* cited by examiner

*Primary Examiner* — Tan V Mai
(74) *Attorney, Agent, or Firm* — Padowithz Alce; Alce PLLC

(57) ABSTRACT

Systems and methods of configuring an array of processors of an integrated circuit includes identifying a fast Fourier transform (FFT) matrix multiply of input data, wherein the FFT matrix multiply of the input data includes a bit-reversed input array, configuring the array of processing cores based on the bit-reversed input array, wherein the configuring the array of processing cores includes storing the input bits of the bit-reversed input array within memory circuits of distinct processing cores of an array of processing cores of the integrated circuit based on an input bit mapping that identifies a pre-determined storage location within the array of processing cores of each input bit of the bit-reversed input array, and performing matrix multiply computations between weight stages of the FFT matrix multiply and the input bits of the bit-reversed input array stored within the memory circuits of the distinct processing cores.

16 Claims, 8 Drawing Sheets

200

Transforming Input Data S210

Mapping an Input Array to a Plurality of Processing Core S220

Computing Input Bit Movements S230

Executing Computations on an Array of Processing Cores S240

200

Transforming Input Data S210

Mapping an Input Array to a Plurality of Processing Core S220

Computing Input Bit Movements S230

Executing Computations on an Array of Processing Cores S240

FIGURE 2

Fast Fourier Transform: Data Layout

8 Point Fast Fourier Transform as a Matrix Multiply

$$\begin{bmatrix} A_0 \\ A_1 \\ A_2 \\ A_3 \\ A_4 \\ A_5 \\ A_6 \\ A_7 \end{bmatrix} = \begin{bmatrix} W^0 & W^0 & W^0 & W^0 & W^0 & W^0 & W^0 & W^0 \\ W^0 & W^1 & W^2 & W^3 & W^4 & W^5 & W^6 & W^7 \\ W^0 & W^2 & W^4 & W^6 & W^0 & W^2 & W^4 & W^6 \\ W^0 & W^3 & W^6 & W^1 & W^4 & W^7 & W^2 & W^5 \\ W^0 & W^4 & W^0 & W^4 & W^0 & W^4 & W^0 & W^4 \\ W^0 & W^5 & W^2 & W^7 & W^4 & W^1 & W^6 & W^3 \\ W^0 & W^6 & W^4 & W^2 & W^0 & W^6 & W^4 & W^2 \\ W^0 & W^7 & W^6 & W^5 & W^4 & W^3 & W^2 & W^1 \end{bmatrix} \begin{bmatrix} a_0 \\ a_1 \\ a_2 \\ a_3 \\ a_4 \\ a_5 \\ a_6 \\ a_7 \end{bmatrix}$$

⇩

Weights_Stage_3      Weights_Stage_2      Weights_Stage_1      Input

FIGURE 3

Fast Fourier Transform : Stage 1, Compute

SYSTEMS AND METHODS FOR AN INTELLIGENT MAPPING OF NEURAL NETWORK WEIGHTS AND INPUT DATA TO AN ARRAY OF PROCESSING CORES OF AN INTEGRATED CIRCUIT

TECHNICAL FIELD

The one or more inventions described herein relate generally to the integrated circuitry field, and more specifically to a new and useful perception and dense algorithm processing integrated circuitry architecture in the integrated circuitry field.

BACKGROUND

Modern applications of artificial intelligence and generally, machine learning appear to be driving innovations in robotics and specifically, in technologies involving autonomous robotics and autonomous vehicles. Also, the developments in machine perception technology have enabled the abilities of many of the implementations in the autonomous robotics' and autonomous vehicles' spaces to perceive vision, perceive hearing, and perceive touch among many other capabilities that allow machines to comprehend their environments.

The underlying perception technologies applied to these autonomous implementations include a number of advanced and capable sensors that often allow for a rich capture of environments surrounding the autonomous robots and/or autonomous vehicles. However, while many of these advanced and capable sensors may enable a robust capture of the physical environments of many autonomous implementations, the underlying processing circuitry that may function to process the various sensor signal data from the sensors often lack in corresponding robust processing capabilities sufficient to allow for high performance and real-time computing of the sensor signal data.

The underlying processing circuitry often include general purpose integrated circuits including central processing units (CPUs) and graphic processing units (GPU). In many applications, GPUs are implemented rather than CPUs because GPUs are capable of executing bulky or large amounts of computations relative to CPUs. However, the architectures of most GPUs are not optimized for handling many of the complex machine learning algorithms (e.g., neural network algorithms, etc.) used in machine perception technology. For instance, the autonomous vehicle space includes multiple perception processing needs that extend beyond merely recognizing vehicles and persons. Autonomous vehicles have been implemented with advanced sensor suites that provide a fusion of sensor data that enable route or path planning for autonomous vehicles. But modern GPUs are not constructed for handling these additional high computation tasks.

At best, to enable a GPU or similar processing circuitry to handle additional sensor processing needs including path planning, sensor fusion, and the like, additional and/or disparate circuitry may be assembled to a traditional GPU. This fragmented and piecemeal approach to handling the additional perception processing needs of robotics and autonomous machines results in a number of inefficiencies in performing computations including inefficiencies in sensor signal processing.

Accordingly, there is a need in the integrated circuitry field for an advanced integrated circuit and processing techniques that are capable of high performance and real-time processing and computing of routine and advanced sensor signals for enabling perception of robotics or any type or kind of perceptual machine.

The inventors of the inventions described in the present application have designed an integrated circuit architecture and one or more processing techniques that allow for enhanced sensor data processing capabilities and have further discovered related methods for implementing the integrated circuit architecture for several purposes including for enabling perception of robotics and various machines.

BRIEF DESCRIPTION OF THE FIGURES

FIG. 2 illustrates a method 200 for mapping input data to an array of processing cores in accordance with one or more embodiments of the present application;

FIG. 3 illustrates a schematic that examples a decomposition of a weight matrix into a plurality of distinct weight stages in accordance with one or more embodiments of the present application;

BRIEF SUMMARY OF THE INVENTION(S)

Figure 1:
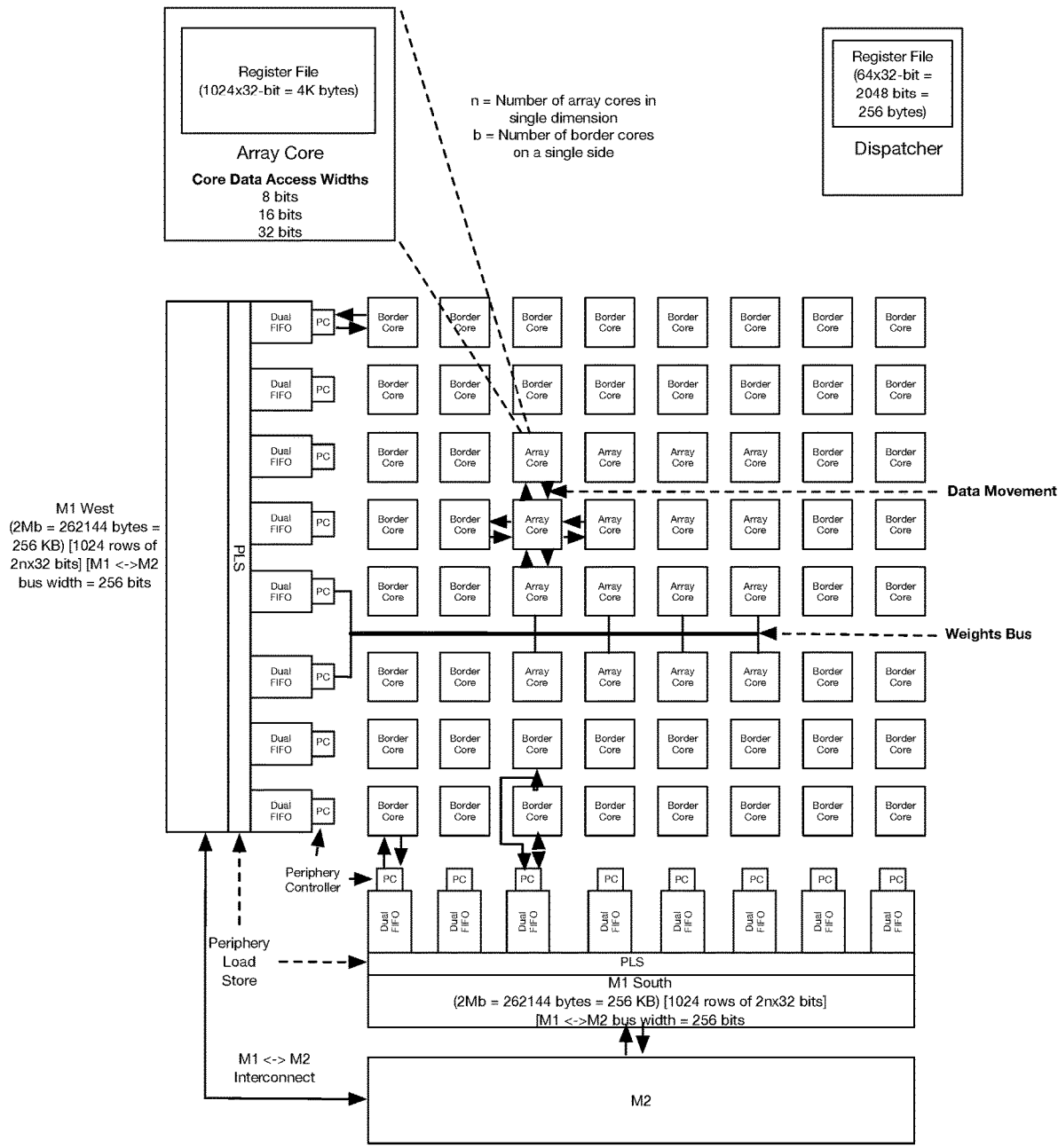
FIG. 1 illustrates a schematic of a system 100 in accordance with one or more embodiments of the present application.

In one embodiment, a method of a transformed input data to an integrated circuit includes implementing a fast Fourier transform (FFT) of input data for processing on an integrated circuit; generating an FFT matrix multiply based on implementing the FFT of the input data, the FFT matrix multiply includes (1) a bit-reversed input array comprising N-bits of input, where N is a number of input bits in the bit-reversed input array; and (2) a plurality of weight stages, wherein each weight stage of the plurality of weight stages comprises a distinct weight matrix; at runtime, storing one or more of the input bits of the bit-reversed input array within memory circuits of distinct processing cores of an array of processing cores of the integrated circuit based on an input bit mapping that identifies a pre-determined storage location within the array of processing cores of each input bit of the bit-reversed input array; and executing, by the array of processing cores, the FFT matrix multiply including performing a plurality of matrix multiply computations between the plurality of weight stages and the input bits of the bit-reversed input array stored within the memory circuits of the distinct processing cores.

In one embodiment, a method includes generating a bit-reversed input bit index that indexes, in a corresponding manner, a sequence of input bits of an input array and a rearranged sequence of the inputs bits that define the bit-reversed input array.

In one embodiment, a method includes generating the input bit mapping of each of the input bits of the bit-reversed input array to a processing core of the array of processing cores based on the bit-reversed input bit index.

In one embodiment, a method includes generating the input bit mapping includes assigning a sequence of input bits of the bit-reversed input array to a memory location within a sequence of processing cores of the array of processing cores, wherein each input bit of the bit-reversed input array is assigned sequentially along the sequence of processing cores.

In one embodiment, if a number of input bits in the sequence of input bits of the bit-reversed input array exceeds a number of processing cores in the sequence of processing cores, wrapping excess input bits of the bit-reversed input array around the array of processing cores by restarting a sequential assignment of the excess input bits along the sequence of processing cores.

In one embodiment, if a number of input bits in the sequence of input bits of the bit-reversed input array exceeds a number of processing cores in the sequence of processing cores, storing multiple input bits of the bit-reversed input array onto one or more processing cores in the sequence of processing cores.

In one embodiment, a method includes computing input bit movement instructions for on-processing core movements of the input bits of the bit-reversed input array for the plurality of matrix multiply computations associated with each of the plurality of weight stages, wherein the input bit movement instructions define one or more automatic transmissions of the input bits of the bit-reversed input array between memory circuits of distinct pairs of processing cores within the array of processing cores.

In one embodiment, computing the input bit movement instructions includes identifying the input bits required for computations at each of the processing cores of the array of processing cores for each of the plurality of weight stages, if a target input bit required for a computation is not stored locally at a target processing core, generating an input bit movement instruction that, when executed, causes the target input bit to transmit from a memory circuit of an originating processing core of the array of processing cores to a memory circuit of the target processing core of the array of processing cores.

In one embodiment, a method includes executing the input bit movement instructions based on the performance of the plurality of matrix multiply computations.

In one embodiment, executing the input bit movement instructions includes executing an input bit swap that exchanges a first input bit stored on a first processing core of the array of processing cores with a second input bit stored on a second processing core of the array of processing cores; and storing the first input bit onto a memory circuit of the second processing core and storing the second input bit onto a memory circuit of the first processing core.

In one embodiment, executing the input bit movement instructions includes executing an input bit core hop instruction that transmits an input bit stored on a memory of an originating processing core of the array of processing cores to a memory circuit of a destination processing core, wherein the input bit core hop instruction indicates a number of processing cores that the input bit moves either in a row or a column of processing cores.

In one embodiment, executing the input bit movement instructions includes executing an input bit rotation instruction that internally transmits an input bit stored on a first memory circuit to a second memory circuit of a target processing core, wherein the internal transmission of the input bit includes a rotation of the input bit from the first memory circuit to the second memory circuit that is between zero and three-hundred sixty degrees.

In one embodiment, a method of configuring an array of processors of an integrated circuit includes identifying a fast Fourier transform (FFT) matrix multiply of input data, wherein the FFT matrix multiply of the input data comprises a bit-reversed input array; configuring the array of processing cores based on the bit-reversed input array, wherein the configuring the array of processing cores includes storing one or more of the input bits of the bit-reversed input array within memory circuits of distinct processing cores of an array of processing cores of the integrated circuit based on an input bit mapping that identifies a pre-determined storage location within the array of processing cores of each input bit of the bit-reversed input array; and at runtime, executing by the array of processing cores the FFT matrix multiply including performing a plurality of matrix multiply computations between a plurality of weight stages of the FFT matrix multiply and the input bits of the bit-reversed input array stored within the memory circuits of the distinct processing cores.

In one embodiment, a method includes generating the input bit mapping of each of the input bits of the bit-reversed input array based on a bit-reversed input bit index that indexes, in a corresponding manner, a sequence of input bits of an input array and a rearranged sequence of the inputs bits that define the bit-reversed input array.

In one embodiment, a method includes generating the input bit mapping includes assigning a sequence of input bits of the bit-reversed input array to a memory location within a sequence of processing cores of the array of processing cores, wherein each input bit of the bit-reversed input array is assigned sequentially along the sequence of processing cores.

In one embodiment, a method includes computing input bit movement instructions for on-processing core movements of the input bits of the bit-reversed input array for the plurality of matrix multiply computations associated with each of the plurality of weight stages, wherein the input bit movement instructions define one or more automatic transmissions of the input bits of the bit-reversed input array between memory circuits of distinct pairs of processing cores within the array of processing cores.

DESCRIPTION OF THE PREFERRED EMBODIMENTS

The following description of preferred embodiments of the present application are not intended to limit the inventions to these preferred embodiments, but rather to enable any person skilled in the art of to make and use these inventions.

Overview

In one or more embodiments of the present application, the systems and techniques described herein may allow for enhanced scheduling and execution of data transfers and computations, in parallel, that reduces latency in the one or more processes of an integrated circuit. In such embodiments, a scheduling of a plurality of memory transfers of inputs and outputs of computations of a computations network graph may be made in such a manner that enables overlaps with computations.

In the one or more embodiments, the methods and systems may function to configure an on-chip memory or data buffer that interfaces with array processing cores of the integrated circuit. In embodiments such as these, the inputs for compute are preferably stored in the OCM and are sourced to the array processing cores and the outputs of the computers are preferably transferred from the array processing cores to and stored by the OCM. Since in some circumstances, the content of the OCM may function to dictate the amount of compute that can be performed by the array processing cores. Because of this, the one or more embodiments of the present application provide systems and techniques that configures the OCM to optimize for both memory transfers and computations. That is, rather than sequential memory transfers to the OCM and subsequent computations based on the memory content of the OCM, the memory transfers are optimized for multiple parallel transfers into the OCM from a main memory based on the computation requirements of the array processing cores and the computations of the array processing cores may be accelerated based on partial dependency encodings of the OCM that allow computations to be performed by the OCM with only partial inputs stored in the OCM.

At least a few technical benefits of the above-noted embodiments of the present application includes the continuous and uninterrupted computations of the array processing cores based on the encoded partial dependencies of the OCM and the continuous and uninterrupted memory transfers of inputs and outputs without the need to wait on the completion of the one or more computations at the array processing cores.

It shall also be recognized that the one or more embodiments of the present application may be implemented in any suitable processing environment including, but not limited to, within one or more IMDs and/or any suitable processing circuit.

The mesh architecture defined by the plurality of processing elements in the array core preferably enable in-memory computing and data movement, as described in U.S. Pat. No. 10,365,860 and U.S. patent application Ser. No. 16/292,537, which are incorporated herein in their entireties by this reference and further, enable a core-level predication and a tile-level predication.

1. A System Architecture of a Dense Algorithm and/or Perception Processing Circuit (Unit)

As shown in FIG. 1, the integrated circuit 100 (dense algorithm and/or perception processing unit) for performing perception processing includes a plurality of array cores 110, a plurality of border cores 120, a dispatcher (main controller) 130, a first plurality of periphery controllers 140, a second plurality of periphery controllers 150, and main memory 160. The integrated circuit 100 may additionally include a first periphery load store 145, a second periphery load store 155, a first periphery memory 147, a second periphery memory 157, a first plurality of dual FIFOs 149, and a second plurality of dual FIFOs 159, as described in U.S. Pat. Nos. 10,365,860, 10,691,464, and U.S. patent application Ser. No. 16/292,537, which are all incorporated herein in their entireties by this reference.

The integrated circuit 100 preferably functions to enable real-time and high computing efficiency of perception data and/or sensor data. A general configuration of the integrated circuit 100 includes a plurality of array core 110 defining central signal and data processing nodes each having large register files that may eliminate or significantly reduce clock cycles needed by an array core 110 for pulling and pushing data for processing from memory. The instructions (i.e., computation/execution and data movement instructions) generating capabilities of the integrated circuit 100 (e.g., via the dispatcher 130 and/or a compiler module 175) functions to enable a continuity and flow of data throughout the integrated circuit 100 and namely, within the plurality of array cores 110 and border cores 120.

An array core 110 preferably functions as a data or signal processing node (e.g., a small microprocessor) or processing circuit and preferably, includes a register file 112 having a large data storage capacity (e.g., 1024 kb, etc.) and an arithmetic logic unit (ALU) 118 or any suitable digital electronic circuit that performs arithmetic and bitwise operations on integer binary numbers. In a preferred embodiment, the register file 112 of an array core 110 may be the only memory element that the processing circuits of an array core 110 may have direct access to. An array core 110 may have indirect access to memory outside of the array core and/or the integrated circuit array 105 (i.e., core mesh) defined by the plurality of border cores 120 and the plurality of array cores 110.

The register file 112 of an array core 110 may be any suitable memory element or device, but preferably comprises one or more static random-access memories (SRAMs). The register file 112 may include a large number of registers, such as 1024 registers, that enables the storage of a sufficiently large data set for processing by the array core 110. Accordingly, a technical benefit achieved by an arrangement of the large register file 112 within each array core 110 is that the large register file 112 reduces a need by an array core 110 to fetch and load data into its register file 112 for processing. As a result, a number of clock cycles required by the array core 112 to push data into and pull data out of memory is significantly reduced or eliminated altogether. That is, the large register file 112 increases the efficiencies of computations performed by an array core 110 because most, if not all, of the data that the array core 110 is scheduled to process is located immediately next to the processing circuitry (e.g., one or more MACs, ALU, etc.) of the array core 110. For instance, when implementing image processing by the integrated circuit 100 or related system using a neural network algorithm(s) or application(s) (e.g., convolutional neural network algorithms or the like), the large register file 112 of an array core may function to enable a storage of all the image data required for processing an entire image. Accordingly, most or if not, all layer data of a neural network implementation (or similar compute-intensive application) may be stored locally in the large register file 112 of an array core 110 with the exception of weights or coefficients of the neural network algorithm(s), in some embodiments. Accordingly, this allows for optimal utilization of the computing and/or processing elements (e.g., the one or more MACs and ALU) of an array core 110 by enabling an array core 110 to constantly churn data of the register file 112 and further, limiting the fetching and loading of data from an off-array core data source (e.g., main memory, periphery memory, etc.).

By comparison, to traverse a register file in a traditional system implemented by a GPU or the like, it is typically required that memory addresses be issued for fetching data from memory. However, in a preferred embodiment that implements the large register file 112, the (raw) input data within the register file 112 may be automatically incremented from the register file 112 and data from neighboring core(s) (e.g., array cores and/or border cores) are continuously sourced to the register file 112 to enable a continuous flow to the computing elements of the array core 110 without an express need to make a request (or issuing memory addresses) by the array core 110.

While in some embodiments of the present application, a predetermined data flow scheduled may mitigate or altogether, eliminate requests for data by components within the integrated circuit array 105, in a variant of these embodiments traditional random memory access may be achieved by components of the integrated circuit array 105. That is, if an array core 110 or a border core 120 recognizes a need for a random piece of data for processing, the array core 110 and/or the border 120 may make a specific request for data from any of the memory elements within the memory hierarchy of the integrated circuit 100.

An array core 110 may, additionally or alternatively, include a plurality of multiplier (multiply) accumulators (MACs) 114 or any suitable logic devices or digital circuits that may be capable of performing multiply and summation functions. In a preferred embodiment, each array core 110 includes four (4) MACs and each MAC 114 may be arranged at or near a specific side of a rectangular shaped array core 110. While, in a preferred embodiment each of the plurality of MACs 114 of an array core 110 may be arranged near or at the respective sides of the array core 110, it shall be known that the plurality of MACs 114 may be arranged within (or possibly augmented to a periphery of an array core) the array core 110 in any suitable arrangement, pattern, position, and the like including at the respective corners of an array core 110. In a preferred embodiment, the arrangement of the plurality of MACs 114 along the sides of an array core 110 enables efficient inflow or capture of input data received from one or more of the direct neighboring cores (i.e., an adjacent neighboring core) and the computation thereof by the array core 110 of the integrated circuit 100.

Accordingly, each of the plurality of MACs 114 positioned within an array core 110 may function to have direct communication capabilities with neighboring cores (e.g., array cores, border cores, etc.) within the integrated circuit 100. The plurality of MACs 114 may additionally function to execute computations using data (e.g., operands) sourced from the large register file 112 of an array core 110. However, the plurality of MACs 114 preferably function to source data for executing computations from one or more of their respective neighboring core(s) and/or a weights or coefficients (constants) bus 116 that functions to transfer coefficient or weight inputs of one or more algorithms (including machine learning algorithms) from one or more memory elements (e.g., main memory 160 or the like) or one or more input sources.

The weights bus 116 may be operably placed in electrical communication with at least one or more of periphery controllers 140, 150 at a first input terminal and additionally, operably connected with one or more of the plurality of array core 110. In this way, the weight bus 116 may function to collect weights and coefficients data input from the one or more periphery controllers 140, 150 and transmit the weights and coefficients data input directly to one or more of the plurality of array cores 110. Accordingly, in some embodiments, multiple array cores no may be fed weights and/or coefficients data input via the weights bus 116 in parallel to thereby improve the speed of computation of the array cores no.

Each array core 110 preferably functions to bi-directionally communicate with its direct neighbors. That is, in some embodiments, a respective array core 110 may be configured as a processing node having a rectangular shape and arranged such that each side of the processing node may be capable of interacting with another node (e.g., another processing node, a data storage/movement node, etc.) that is positioned next to one of the four sides or each of the faces of the array core 110. The ability of an array core 110 to bi-directionally communicate with a neighboring core along each of its sides enables the array core 110 to pull in data from any of its neighbors as well as push (processed or raw) data to any of its neighbors. This enables a mesh communication architecture that allows for efficient movement of data throughout the collection of array and border cores 110, 120 of the integrated circuit 100.

Each of the plurality of border cores 120 preferably includes a register file 122. The register file 122 may be configured similar to the register file 112 of an array core no in that the register file 122 may function to store large datasets. Preferably, each border core 120 includes a simplified architecture when compared to an array core 110. Accordingly, a border core 120 in some embodiments may not include execution capabilities and therefore, may not include multiplier-accumulators and/or an arithmetic logic unit as provided in many of the array cores no.

In a traditional integrated circuit (e.g., a GPU or the like), when input image data (or any other suitable sensor data) received for processing compute-intensive application (e.g., neural network algorithm) within such a circuit, it may be necessary to issue padding requests to areas within the circuit which do not include image values (e.g., pixel values) based on the input image data. That is, during image processing or the like, the traditional integrated circuit may function to perform image processing from a memory element that does not contain any image data value. In such instances, the traditional integrated circuit may function to request that a padding value, such as zero, be added to the memory element to avoid subsequent image processing efforts at the memory element without an image data value. A consequence of this typical image data processing by the traditional integrated circuit results in a number of clock cycles spent identifying the blank memory element and adding a computable value to the memory element for image processing or the like by the traditional integrated circuit.

In a preferred implementation of the integrated circuit 100, one or more of the plurality of border cores 120 may function to automatically set to a default value when no input data (e.g., input sensor data) is received. For instance, input image data from a sensor (or another circuit layer) may have a total image data size that does not occupy all border core cells of the integrated circuit array 105. In such instance, upon receipt of the input image data, the one or more border cores 120 (i.e., border core cells) without input image data may be automatically set to a default value, such as zero or a non-zero constant value.

In some embodiments, the predetermined input data flow schedule generated by the dispatcher and sent to one or more of the plurality of border cores may include instructions to set to a default or a predetermined constant value. Additionally, or alternatively, the one or more border cores 120 may be automatically set to a default or a predetermined value when it is detected that no input sensor data or the like is received with a predetermined input data flow to the integrated circuit array 105. Additionally, or alternatively, in one variation, the one or more border cores 120 may be automatically set to reflect values of one or more other border cores having input sensor data when it is detected that no input sensor data or the like is received with a predetermined input data flow to the integrated circuit array 105.

Accordingly, a technical benefit achieved according to the implementation of one or more of the plurality of border cores 120 as automatic padding elements, may include increasing efficiencies in computation by one or more of the plurality of array cores 110 by minimizing work requests to regions of interest (or surrounding areas) of input sensor data where automatic padding values have been set. Thereby, reducing clock cycles used by the plurality of array core 110 in performing computations on an input dataset.

In a preferred implementation of the integrated circuit 100, the progression of data into the plurality of array cores no and the plurality of border cores 120 for processing is preferably based on a predetermined data flow schedule generated at the dispatcher 130. The predetermined data flow schedule enables input data from one or more sources (e.g., sensors, other NN layers, an upstream device, etc.) to be loaded into the border cores 120 and array cores no without requiring an explicit request for the input data from the border cores 120 and/or array cores no. That is, the predetermined data flow schedule enables an automatic flow of raw data from memory elements (e.g., main memory 160) of the integrated circuit 100 to the plurality of border cores 120 and the plurality of array cores no having capacity to accept data for processing. For instance, in the case that an array core 110 functions to process a first subset of data of a data load stored in its register file 112, once the results of the processing of the first subset of data is completed and sent out from the array core 110, the predetermined data flow schedule may function to enable an automatic flow of raw data into the array core 110 that adds to the data load at the register file 112 and replaces the first subset of data that was previously processed by the array core 110. Accordingly, in such instance, no explicit request for additional raw data for processing is required from the array core 110. Rather, the integrated circuit 100 implementing the dispatcher 130 may function to recognize that once the array core 110 has processed some amount of data sourced from its register file 112 (or elsewhere) that the array core 110 may have additional capacity to accept additional data for processing.

In a preferred embodiment, the integrated circuit 100 may be in operable communication with an instructions generator 170 that functions to generate computation, execution, and data movement instructions, as shown by way of example in FIG. 3A. The instructions generator 170 may be arranged off-chip relative to the components and circuitry of the integrated 100. However, in alternative embodiments, the instructions generator 170 may be cooperatively integrated within the integrated circuit 100 as a distinct or integrated component of the dispatcher 130.

Preferably, the instructions generator 170 may be implemented using one or more general purpose computers (e.g., a Mac computer, Linux computer, or any suitable hardware computer) or general-purpose computer processing (GPCP) units 171 that function to operate a compiler module 175 that is specifically configured to generate multiple and/or disparate types of instructions. The compiler module 175 may be implemented using any suitable compiler software (e.g., a GNU Compiler Collection (GCC), a Clang compiler, and/or any suitable open-source compiler or other compiler). The compiler module 175 may function to generate at least computation instructions and execution instructions as well as data movement instructions. In a preferred embodiment, at compile time, the compiler module 175 may be executed by the one or more GPCP units 171 to generate the two or more sets of instructions computation/execution instructions and data movement instructions sequentially or in parallel. In some embodiments, the compiler module 175 may function to synthesize multiple sets of disparate instructions into a single composition instruction set that may be loaded into memory (e.g., instructions buffer, an external DDR, SPI flash memory, or the like) from which the dispatcher may fetch the single composition instruction set from and execute.

In a first variation, however, once the compiler module 175 generates the multiple disparate sets of instructions, such as computation instructions and data movement instructions, the instructions generator 170 may function to load the instructions sets into a memory (e.g., memory 160 or off-chip memory associated with the generator 170). In such embodiments, the dispatcher 130 may function to fetch the multiple sets of disparate instructions generated by the instructions generator 170 from memory and synthesize the multiple sets of disparate instructions into a single composition instruction set that the dispatcher may execute and/or load within the integrated circuit 100.

In a second variation, the dispatcher 130 may be configured with compiling functionality to generate the single composition instruction set. In such variation, the dispatcher 130 may include processing circuitry (e.g., microprocessor or the like) that function to create instructions that include scheduled computations or executions to be performed by various circuits and/or components (e.g., array core computations) of the integrated circuit 100 and further, create instructions that enable a control a flow of input data through the integrated circuit 100. In some embodiments, the dispatcher 130 may function to execute part of the instructions and load another part of the instructions into the integrated circuit array 105. In general, the dispatcher 130 may function as a primary controller of the integrated circuit 100 that controls and manages access to a flow (movement) of data from memory to the one or more other storage and/or processing circuits of the integrated circuit 100 (and vice versa). Additionally, the dispatcher 130 may schedule control execution operations of the various sub-controllers (e.g., periphery controllers, etc.) and the plurality of array cores 110.

In some embodiments, the processing circuitry of the dispatcher 130 includes disparate circuitry including a compute instruction generator circuit 132 and a data movement instructions generator circuit 134 (e.g., address generation unit or address computation unit) that may independently generate computation/execution instructions and data transfers/movements schedules or instructions, respectively. Accordingly, this configuration enables the dispatcher 130 to perform data address calculation and generation of computation/execution instructions in parallel. The dispatcher 130 may function to synthesize the output from both the computer instructions generator circuit 132 and the data movement instructions generator circuit 134 into a single instructions composition that combines the disparate outputs.

The single instructions composition generated by the instructions generator 170 and/or the dispatcher 130 may be provided to the one or more downstream components and integrated circuit array 105 and allow for computation or processing instructions and data transfer/movement instructions to be performed simultaneously by these various circuits or components of the integrated circuit 100. With respect to the integrated circuit array 105, the data movement component of the single instructions composition may be performed by one or more of periphery controllers 140, 150 and compute instructions by one or more of the plurality of array cores 110. Accordingly, in such embodiment, the periphery controllers 140, 150 may function to decode the data movement component of the instructions and if involved, may perform operations to read from or write to the dual FIFOs 149, 159 and move that data from the dual FIFOs 149, 159 onto a data bus to the integrated circuit (or vice versa). It shall be understood that the read or write operations performed by periphery controllers 140, 150 may performed sequentially or simultaneously (i.e., writing to and reading from dual FIFOs at the same time).

It shall be noted that while the compute instructions generator circuit 132 and the data movement instructions generator circuit 134 are preferably separate or independent circuits, in some embodiments the compute instructions generator circuit 132 and the data movement instructions generator circuit 134 may be implemented by a single circuit or a single module that functions to perform both compute instructions generation and data movement instruction generation.

In operation, the dispatcher 130 may function to generate and schedule memory addresses to be loaded into one or more the periphery load store 145 and the periphery load store 155. The periphery load stores 145, 155 preferably include specialized execution units that function to execute all load and store instructions from the dispatcher 130 and may generally function to load or fetch data from memory or storing the data back to memory from the integrated array core. The first periphery load store 145 preferably communicably and operably interfaces with both the first plurality of dual FIFOs 149 and the first periphery memory 147. The first and the second periphery memory 147, 157 preferably comprise on-chip static random-access memory.

In configuration, the first periphery load store 145 may be arranged between the first plurality of dual FIFOs 149 and the first periphery memory 147 such that the first periphery load store 145 is positioned immediately next to or behind the first plurality of dual FIFOs 149. Similarly, the second periphery load store 155 preferably communicably and operably interfaces with both the second plurality of dual FIFOs 159 and the second periphery memory 157. Accordingly, the second periphery load store 155 may be arranged between the second plurality of dual FIFOs 159 and the second periphery memory 157 such that the second periphery load store 155 is positioned immediately next to or behind the second plurality of dual FIFOs 159.

In response to memory addressing instructions issued by the dispatcher 130 to one or more of the first and the second periphery load stores 145, 155, the first and the second periphery load stores 145, 155 may function to execute the instructions to fetch data from one of the first periphery memory 147 and the second periphery memory 157 and move the fetched data into one or more of the first and second plurality of dual FIFOs 149, 159. Additionally, or alternatively, the dual FIFOs 149, 159 may function to read data from a data bus and move the read data to one or more of the respective dual FIFOs or read data from one or more of the dual FIFOs and move the read data to a data bus. Similarly, memory addressing instructions may cause one or more of the first and the second periphery load stores 145, 155 to move data collected from one or more of the plurality of dual FIFOs 149, 159 into one of the first and second periphery memory 147, 157.

Each of the first plurality of dual FIFOs 149 and each of the second plurality of dual FIFOs 159 preferably comprises at least two memory elements (not shown). Preferably, the first plurality of dual FIFOs 149 may be arranged along a first side of the integrated circuit array 105 with each of the first plurality of dual FIFOs 149 being aligned with a row of the integrated circuit array 105. Similarly, the second plurality of dual FIFOs 159 may be arranged along a second side of the integrated circuit array 105 with each of the second plurality of dual FIFOs 159 being aligned with a column of the integrated circuit array 105. This arrangement preferably enables each border 120 along the first side of the integrated circuit array 105 to communicably and operably interface with at least one of the first periphery controllers 145 and each border 120 along the second side of the integrated circuit array 105 to communicably and operably interface with at least one of the second periphery controllers 155.

While it is illustrated in at least FIG. 1 that there are a first and second plurality of dual FIFOs, first and second periphery controllers, first and second periphery memories, and first and second load stores, it shall be noted that these structures may be arranged to surround an entire periphery of the integrated circuit array 105 such that, for instance, these components are arranged along all (four) sides of the integrated circuit array 105.

The dual FIFOs 149, 159 preferably function to react to specific instructions for data from their respective side. That is, the dual FIFOs 149, 159 may be configured to identify data movement instructions from the dispatcher 130 that is specific to either the first plurality of dual FIFOs 149 along the first side or the second plurality of dual FIFOs along the second side of the integrated circuit array 105.

According to a first implementation, each of the dual FIFOs may use first of the two memory elements to push data into the integrated circuit array 105 and second of the two memory elements to pull data from the integrated circuit array 105. Thus, each dual FIFO 149, 159 may have a first memory element dedicated for moving data inward into the integrated circuit array 105 and a second memory element dedicated for moving data outward from the integrated circuit array 105.

According to a second implementation, the dual FIFOs may be operated in a stack (second) mode in which each respective dual FIFO functions to provide data into the integrated circuit array 105 in a predetermined sequence or order and collect the data from the integrated circuit array 105 in the same predetermined sequence or order.

Additionally, the integrated circuit 100 preferably includes main memory 160 comprising a single unified memory. The main memory 160 preferably functions to store data originating from one or more sensors, system-derived or generated data, data from one or more integrated circuit layers, data from one or more upstream devices or components, and the like. Preferably, the main memory 160 comprises on-chip static random-access memory or the like.

Additionally, or alternatively, main memory 160 may include multiple levels of on-die (on-chip) memory. In such embodiments, the main memory 160 may include multiple memory (e.g., SRAM) elements that may be in electrical communication with each other and function as a single unified memory that is arranged on a same die as the integrated circuit array 105.

Additionally, or alternatively, main memory 160 may include multiple levels of off-die (off-chip) memory (not shown). In such embodiments, the main memory 160 may include multiple memory (e.g., DDR SRAM, high bandwidth memory (HBM), etc.) elements that may be in electrical communication with each other and function as a single unified memory that is arranged on a separate die than the integrated circuit array.

It shall be noted that in some embodiments, the integrated circuit 100 includes main memory 160 comprising memory arranged on-die and off-die. In such embodiments, the on-die and the off-die memory of the main memory 160 may function as a single unified memory accessible to the on-die components of the integrated circuit 100.

Each of the first periphery memory 147 and the second periphery memory 157 may port into the main memory 160. Between the first periphery memory 147 and the main memory 160 may be arranged a load store unit that enables the first periphery memory 147 to fetch data from the main memory 160. Similarly, between the second periphery memory 157 and the main memory 160 may be arranged a second load store unit that enables the second periphery memory 157 to fetch data from the main memory 160.

It shall be noted that the data transfers along the memory hierarchy of the integrated circuit 100 occurring between dual FIFOs 149, 159 and the load stores 145, 155, between the load stores 145, 155 and the periphery memory 147, 157, and the periphery memory 147, 157 and the main memory 160 may preferably be implemented as prescheduled or predetermined direct memory access (DMA) transfers that enable the memory elements and load stores to independently access and transfer data within the memory hierarchy without direct invention of the dispatcher 130 or some main processing circuit. Additionally, the data transfers within the memory hierarchy of the integrated circuit 100 may be implemented as 2D DMA transfers having two counts and two strides thereby allowing for efficient data access and data reshaping during transfers. In a preferred embodiment, the DMA transfers may be triggered by a status or operation of one or more of the plurality of array cores 110. For instance, if an array core is completing or has completed a processing of first set of data, the completion or near-completion may trigger the DMA transfers to enable additional data to enter the integrated circuit array 105 for processing.

2. Method for Mapping Weights and Input Data to an Array of Processing Cores of an Integrated Circuit As shown by way of example in FIG. 2, a method 200 for mapping weights and input data to an array of processing cores of an integrated circuit includes transforming input data S210, mapping input bits and weights based on an FFT transformation S220, computing one or more pre-determined schedules of input data movements S230, and executing computations on an array of processing cores S240.

2.10 Input Array Transformation|Input Array Decomposition

S210, which includes transforming input data, may function to identify and/or receive input data for computation on an integrated circuit and transform the input data for improving efficiencies in computations involving the input data. In one or more embodiments, a transformation of the input data may be in response to receiving and/or executing an API call function that includes the input data that, upon receipt, automatically causes an execution of one or more complex API functions for transforming (e.g., via an FFT or the like) the input data, mapping the input data to a plurality of processing cores of the integrated circuit, and generating one or more data movement schedules that may enable input bits and/or bytes of data to move between the plurality of processing cores preferably without the use of a random-access unit (RMU) or the like (i.e., RMU-less data movements). It shall be recognized that the plurality of processing cores may be defined by any suitable collection or grouping of processing cores including, but not limited to, mesh-connected processing circuits or cores.

Input Data Preparation|Input Bit Reversal

In a preferred implementation, transforming the input data may include performing a Fourier transform of the input data. In such preferred implementation, S210 may function to perform a fast Fourier transform that decomposes the input data into a computationally efficient matrix multiply. In one or more embodiments, depending on the number of inputs, S210 may function to perform a fast Fourier transform (FFT) comprising an N-point discrete Fourier transform (DFT) of the input data. In such embodiments, the N-point DFT may reconfigure the input data as a matrix product. That is, S210 may function to re-define the input data as a matrix multiply of a weight matrix and an input array.

An application of the N-point DFT may function to rearrange the input array of the matrix multiply such that the pieces of data of the input array may be bit-reversed. That is, according to a binary representation of the original sequence or arrangement of the input array, S210 may function to reverse the binary representation to produce a bit-reversed value at each input entry within the input array. For instance, a binary input value of 011 within an input array may be bit-reversed to 110 thereby arranging a new piece of input data (110) into the place of the original input data (011) within the input array.

In one or more embodiments, S210 may additionally or alternatively function to generate, at runtime, a bit reversal table or bit reversal reference data structure that illustrates an original sequence of input within the input array together with corresponding entries of the bit-reversed values of the input within the array. In this way, during one or more computations, a reference may be made for identifying the original input and its bit-reversed value that may be used in the one or more computations of an integrated circuit.

Transformed Weight Matrix|Weight Stages Expansion-|Factorization of Weight Matrices Additionally, or alternatively, in one or more embodiments, S210 may function to decompose the weight matrix component of the N-point FFT matrix multiply into a plurality of distinct weight stages, as shown by way of example in FIG. 3. In the application of FFT to the input data, S210 may function to compute a number of (computation) stages based on $2^R=N$ where R may be the number of weight stages and the number of distinct weight matrices. Accordingly, a factorization of weight matrix component expands the weight matrix component into a plurality of light weight matrixes, in that, weight stage matrices of each weight stage may include a plurality of zeros (o) in each weight stage matrix that reduces the computation required since the plurality of zeros enables a reduction in multiply operations and add operations required by a processing core of the integrated circuit.

2.20 Transformed Matrix Multiply: Weight and Input Bit Mapping

S220, which includes mapping input bits and weights based on an FFT transformation, may function to map each of the input array and the corresponding weight stage matrices to an array processing cores of the integrated circuit based on an arrangement of the weights in each weight stage matrix and an arrangement of each piece of input data within the input array. In a preferred embodiment, each processing core of the integrated circuit includes processing and/or computational circuitry (e.g., a local processor) together with memory circuitry (e.g., local memory, a register file). It shall be recognized that one or more distinct API functions may be received and/or executed for performing the operations of S220 including but not limited to generating an input bit mapping and a weight mapping.

Input Bit Mapping

Figure 5:
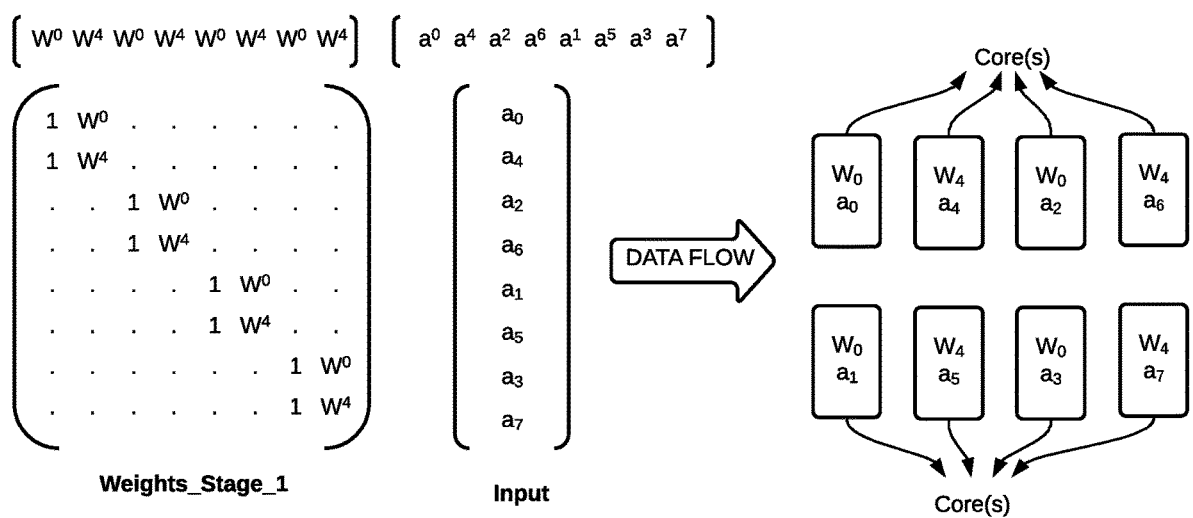
FIG. 5 illustrates a schematic that examples a mapping of an input array and weight matrices onto an array of processing cores in accordance with one or more embodiments of the present application.

In a preferred embodiment, mapping the input array to the array of processing cores of an integrated circuit includes distinctly mapping and/or storing each input bit of the bit-reversed input array to one processing core of the array of processing cores, as shown by way of example in FIG. 5. In such preferred embodiment, S220 preferably functions to map and/or store each input bit of the bit-reversed input array based on the bit-reversed sequence or order of the input bits within the bit-reversed input array. That is, the order of the input bits within the bit-reversed input array may control or inform the mapping and storage of each input bit to the array of processing cores. In a non-limiting example, if a sequence of input bits of a bit-reversed input array includes the sequence a0, a4, a2, and a6, S220 may function to map and store the input bits along the array of processing cores by storing the first input bit in the sequence onto a local memory of a first available processing core in a row or in a column of processing cores in the array core and the second input bit may be stored onto a second available processing core and onward until all inputs are stored sequentially onto one or more sequences of processing cores based on the order in which the inputs bit appear or exist in the bit-reversed input array.

Figure 8:
FIG. 8 illustrates a schematic that examples bit wrapping of an input array onto an array of processing cores in accordance with one or more embodiments of the present application.

Accordingly, in one or more embodiments, an arrangement of the processing cores within the array of processing cores may be known, at runtime, and may also inform a mapping and a storage of the input bits of the bit-reversed input array. That is, in one or more embodiments, the integrated circuit may include an n-dimensional array of processing cores in which each of the dimensions are available and known during a mapping and storage of input data to the array of processing cores. Accordingly, in one or more embodiments, the input bit mapping may include a mapping or listing that includes two-dimensional or three-dimensional coordinates for each processing core of a plurality of processing cores and one or more input bits (input bytes) of an input array being stored at each of the 2-D or 3-D coordinates of the array of processing cores. That is, in such embodiments, each input bit or input byte of an input array may be assigned a 2-D or 3-D storage (memory) location along an array of processing cores. In a non-limiting example, an integrated circuit may include a two-dimensional array of processing cores that may be 4×4 in dimensions, such that the array of processing cores may span four processing cores along its width and four processing cores along its height. In such example, in an input array includes a sequence of four distinct input bits, S220 may function to map and store each one of the four distinct input bits to one of four processing cores arranged in a sequence, preferably along a row or a column. In the case of four distinct input bytes of data, S220 may function to map and store each of the four distinct input bytes to one of the four processing cores arranged in sequence. In another non-limiting example, if the input array includes a sequence of eight (8) distinct input bits, S220 may function to map and store, sequentially, each of the first four distinct input bits of the input array to one of four processing cores arranged in a sequence and may additionally function to wrap the latter four bits of the 8 distinct inputs bits by mapping and storing, sequentially, each of the latter four distinct input bits along one of the same four processing cores, as shown by way of example in FIG. 8. In this example, if the input array includes an example sequence of input bits, such as a0, a1, a2, a3, a4, a5, a6, and a7, input bit a4 may be mapped and stored into a same processing core as a0, a5 with a1, a6 with a2, and a7 with a3.

Weights Mapping

Additionally, or alternatively, S220 may function to map the weights of each of the plurality of weight stages of the FFT matrix multiply to array of processing cores. In a preferred embodiment, S220 may function to assign and/or map each of the weights of the plurality of weights stages to the array of processing cores based on a sequence or an order in which the weights appear within each of the plurality of weight stages. In such embodiments, a sequence of the weight matrix stages may additionally inform the order in which weights may be mapped to the array of processing cores.

In one or more embodiments, in a similar manner to a mapping of input bits of an input array, S220 may function to map each weight, sequentially to one processing core of the array of processing cores, in the order or the sequence in which the weight appears beginning with a first weight matrix stage and onward.

In one implementation, each processing core of the array of processing core may include and/or have access to a weight generation index that enables the distinct processing core to generate its assigned weight. In a preferred embodiment, each processing core may be encoded with a weight generation index.

2.30 Compute Input Bit Movement Parameters/Instructions

S230, which includes computing one or more pre-determined schedules of input data movements (based on API instructions), may function to identify and/or calculate a predetermined schedule or automatic flow of input data movement instructions between pairs of processing cores of the array of processing cores. In one or more embodiments, a predetermined schedule for automatic movements of input data within an integrated circuit includes instructions for automatically storing input bits of an input array to an initial storage location on memories (on-core memory) of the array of processing cores and movement instructions that automatically move input data bits within and between on-core memory of the processing cores between and during an execution of one or more computations by the processing cores.

Figure 4:
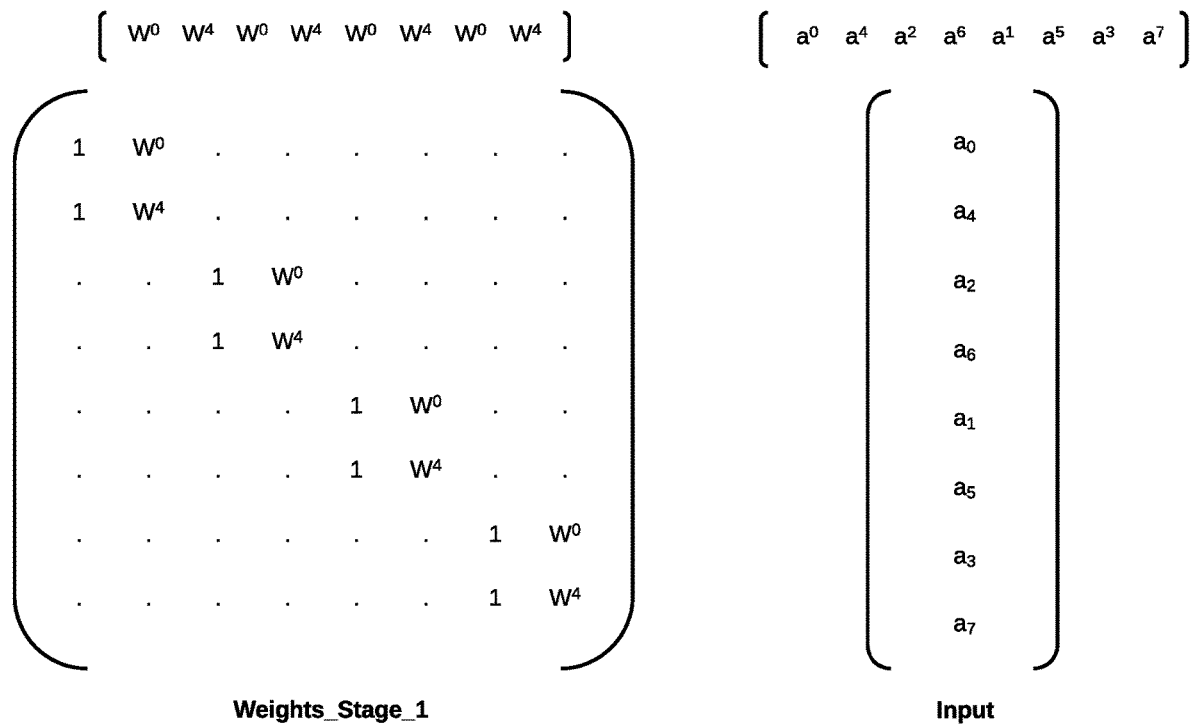
FIG. 4 illustrates a schematic that examples a bit reversal of an input array and a bit-reversed input index in accordance with one or more embodiments of the present application.

In a preferred embodiment, the computation of the pre-determined schedule of input data movements between processing cores of an array of processing cores may be based on one or more of a bit-reversed input bit index of an FFT matrix multiply, as shown by way of example in FIG. 4, and the matrix multiply computations to be performed involving the weight matrix stages of the FFT matrix multiply. In such preferred embodiment, the predetermined schedule of input data movements may include (1) instructions that, when executed, perform an initial input bit spread of the input bits of an input array to the array of processing cores and (2) instructions, that when executed, perform inter-processing core (i.e., bit movement between two distinct cores) and intra-processing core (i.e., bit movements within a single processing core) input bit data movements.

Input Bit Spreading to Array of Processing Cores

In one or more embodiments, at run-time, S230 may function to execute an initial bit spreading of input bits of a target bit-reversed input array to an array of processing cores based on a pre-computed input bit mapping of the input bits to distinct processing cores of the array of processing cores and a bit-reversed input bit index derived based on a transformation of the input array. At runtime, in such embodiments, S230 may function to access, via a random-access unit or the like, the bit-reversed input bit index for the target bit-reversed input array to identify a memory location (address) of each input bit of the bit-reversed input array based on the correspondence between the bit-reversed input bits of the bit-reversed input array that are required for computations and the input bits in their original sequence within the (untransformed) input array.

Accordingly, S230 may function to flow the input bits of the bit-reversed input array into the array of processing cores and store each input bit onto a memory of a respective processing core of the array of processing cores based on a storage positioning for each input bit identified from the input bit mapping.

On-Processing Core Bit Movements

Additionally, or alternatively, computing instructions for on-processing core movements of a bit-reversed input array may include computing one or more of an input bit swap, an input bit hop or core hop, an input bit data rotation, and/or the like for one or more of the bit-reversed input bits. In a preferred embodiment, computing the instructions for the on-processing core movements of the bit-reversed input array may be based on at least the input bit mapping and a sequence of computations derived from each of a plurality of weight matrix stages of the FFT matrix multiply.

In one or more embodiments, computing the instruction for on-processing core movements of the input bits stored within the memories of the array of processing cores includes generating data rotation instructions for an input bit. In such embodiments, the data rotation instructions may include a sequence of input bit movement instructions, that when executed, causes the input bit to move in a degree of rotation between zero (o) degrees and three-hundred sixty (360) degrees within a single processing core of the array of processing cores, as described in more detail in U.S. patent application Ser. No. 17/222,847, which is incorporated herein in its entirety by this reference. Preferably, each processing core of the array of processing cores may include a plurality of memory circuits arranged along an interior or along peripheral edges of the core, such that the input bit may be transmitted rotationally within the processing core. In one non-limiting example, S230 may function to compute a data rotation instruction of one-hundred eighty (180) degrees that, when executed, moves an input bit from a first side of a processing core to an opposite, second side of the processing core by rotating the input data bit 180 degrees internally through the processing core from the first side to the second side of the processing core.

Figure 7:
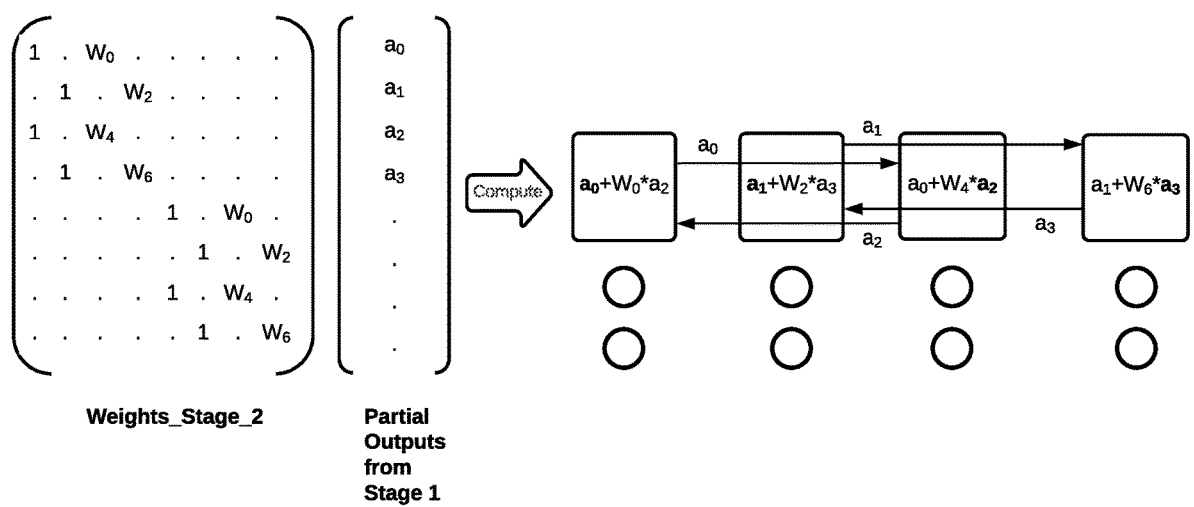
FIG. 7 illustrates a schematic that examples movements of input bits within an array of processing cores in accordance with one or more embodiments of the present application.

In one or more embodiments, computing the instruction for on-processing core movements of the input bits stored within the memories of the array of processing cores includes generating core hop instructions for an input bit. In such embodiments, the core hop instructions may include an input bit movement instruction that, when executed, causes an input bit stored on a first processing core of the array of processing cores to be transmitted or moved to a neighboring processing core within the array of processing cores, as shown by way of example in FIG. 7. In some embodiments, core hop instructions may include a multi-hop instructions that causes an input bit to traverse multiple processing cores within the array of processing cores. For instance, in a sequence of four processing cores, a multi-hop instruction of hop-2, when executed, may cause an input bit stored on a first processing core of the sequence to move to a third processing core of the sequence thereby moving over two processing cores by virtue of the multi-hop instruction. Accordingly, in one or more embodiments, input bit core hop (core hop) instructions preferably include a number of processing cores that an input bit may move until arriving at a destination processing core within the array of processing cores.

Figure 6:
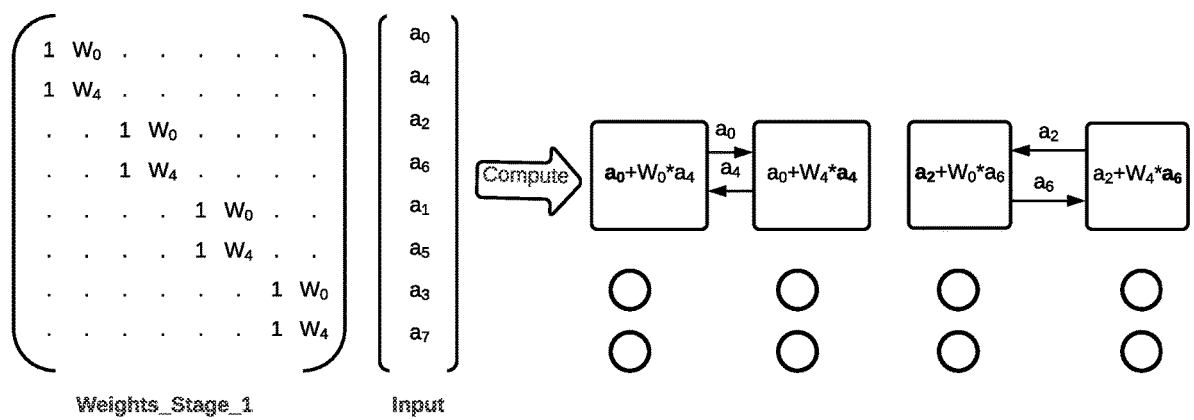
FIG. 6 illustrates a schematic of a computation of a first stage of an FFT matrix multiply in accordance with one or more embodiments of the present application.

In one or more embodiments, computing the instruction for on-processing core movements of the input bits stored within the memories of the array of processing cores includes generating input bit swapping instructions for a pair of input bits. In such embodiments, the input bit swap instructions may include input bit movement instructions that, when executed, causes a pair of distinct input bits stored on two distinct processing cores of an array of processing cores to swap or switch positions, as shown by way of example in FIG. 6. That is, in one non-limiting example, a first input bit stored on a first processing core and a second input bit stored on a second processing core of an array of processing cores may switch their local storage position by simultaneously or near-simultaneously transmitting the first input bit to a memory of the second processing core and the second input bit to a memory of the first processing core. Preferably, an input bit swap may be performed between pairs of processing cores that may be arranged directly adjacent. However, in some embodiments, an input bit swap may be performed between any pair of processing cores within the array within a same column or same row of processing cores.

It shall be recognized that the instructions for on-processing core movements of the input bits may include any combination of distinct input bit movement instructions that enables a predetermined movement or flow of input bits throughout an array of processing cores without a need for computing memory addresses or the like for each movement of an input bit.

2.4 Computations: FFT Matrix Multiply

S240, which includes executing computations on an array of processing cores, may function to perform a plurality of computations across the array of processing cores based on an FFT mapping of input bits and weights onto the array of processing cores. In a preferred embodiment, S240 may function to execute a plurality of computations based on the FFT matrix multiply that includes two or more computational stages (i.e., weight stages).

In one or more embodiments, input bit of the bit-reversed input array may flow into a target processing core of the array of processing cores from one or more directions. That is, in such embodiments, the target processing core may be encompassed by a plurality of distinct processing cores within the array of processing cores that may simultaneously each deliver or transmit input bits to the target processing core. In a preferred embodiment, S240 may function to evaluate a predicate to determine which input bits received from the plurality of distinct processing cores that the target processing core may compute against. In one or more embodiments, a predicate may include one or more predicate statements (e.g., if/else statements, etc.) for evaluating at least a pair of input bits and deciding which of input bit of the pair of inputs should be processed based on a side of the target processing core through which each of the input bits in the pair of input bits may have been sourced, as described in more detail in U.S. Pat. No. 10,761,848, which is incorporated herein in its entirety by this reference. In such binary evaluation of a predicate, the pair of input bits may be associated with distinct input bits entering an east and a west side of the target processing core or distinct input bits entering a north and a south side of the target processing core. Thus, the evaluation of the predicate may identify which input bit of the east and the west sides of the processing core that may be processed or which input bit of the north and the south sides of the processing core that may be processed during a given computation.

Additionally, or alternatively, in one or more embodiments, executing computations on an array of processing cores may include an execution of one or more input bit movement instructions including, but not limited to, an input bit rotation, an input bit core hop, an input swap, and/or the like.

The systems and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processor and/or the controller. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed:

1. A method of a transformed input data to an integrated circuit, the method comprising:
    implementing a fast Fourier transform (FFT) of input data for processing on an integrated circuit;
    generating an FFT matrix multiply based on implementing the FFT of the input data, the FFT matrix multiply comprising:
        (1) a bit-reversed input array comprising N-bits of input, where N is a number of input bits in the bit-reversed input array; and
        (2) a plurality of weight stages, wherein each weight stage of the plurality of weight stages comprises a distinct weight matrix;
    at runtime:
        storing one or more of the input bits of the bit-reversed input array within memory circuits of distinct processing cores of an array of processing cores of the integrated circuit based on an input bit mapping that identifies a pre-determined storage location within the array of processing cores of each input bit of the bit-reversed input array; and
        executing, by the array of processing cores, the FFT matrix multiply including performing a plurality of matrix multiply computations between the plurality of weight stages and the input bits of the bit-reversed input array stored within the memory circuits of the distinct processing cores.

2. The method according to claim 1, further comprising:
    generating a bit-reversed input bit index that indexes, in a corresponding manner, a sequence of input bits of an input array and a rearranged sequence of the inputs bits that define the bit-reversed input array.

3. The method according to claim 2, further comprising:
    generating the input bit mapping of each of the input bits of the bit-reversed input array to a processing core of the array of processing cores based on the bit-reversed input bit index.

4. The method according to claim 1, further comprising:
    generating the input bit mapping includes assigning a sequence of input bits of the bit-reversed input array to a memory location within a sequence of processing cores of the array of processing cores, wherein each input bit of the bit-reversed input array is assigned sequentially along the sequence of processing cores.

5. The method according to claim 4, wherein
    if a number of input bits in the sequence of input bits of the bit-reversed input array exceeds a number of processing cores in the sequence of processing cores, wrapping excess input bits of the bit-reversed input array around the array of processing cores by restarting a sequential assignment of the excess input bits along the sequence of processing cores.

6. The method according to claim 4, wherein
    if a number of input bits in the sequence of input bits of the bit-reversed input array exceeds a number of processing cores in the sequence of processing cores, storing multiple input bits of the bit-reversed input array onto one or more processing cores in the sequence of processing cores.

7. The method according to claim 1, further comprising:
    computing input bit movement instructions for on-processing core movements of the input bits of the bit-reversed input array for the plurality of matrix multiply computations associated with each of the plurality of weight stages, wherein the input bit movement instructions define one or more automatic transmissions of the input bits of the bit-reversed input array between memory circuits of distinct pairs of processing cores within the array of processing cores.

8. The method according to claim 7, wherein
    computing the input bit movement instructions includes:
        identifying the input bits required for computations at each of the processing cores of the array of processing cores for each of the plurality of weight stages,
        if a target input bit required for a computation is not stored locally at a target processing core, generating an input bit movement instruction that, when executed, causes the target input bit to transmit from a memory circuit of an originating processing core of the array of processing cores to a memory circuit of the target processing core of the array of processing cores.

9. The method according to claim 7, further comprising:
    executing the input bit movement instructions based on the performance of the plurality of matrix multiply computations.

10. The method according to claim 9, wherein
    executing the input bit movement instructions includes:
        executing an input bit swap that exchanges a first input bit stored on a first processing core of the array of processing cores with a second input bit stored on a second processing core of the array of processing cores; and
        storing the first input bit onto a memory circuit of the second processing core and storing the second input bit onto a memory circuit of the first processing core.

11. The method according to claim 9, wherein
    executing the input bit movement instructions includes:
        executing an input bit core hop instruction that transmits an input bit stored on a memory of an originating processing core of the array of processing cores to a memory circuit of a destination processing core, wherein the input bit core hop instruction indicates a number of processing cores that the input bit moves either in a row or a column of processing cores.

12. The method according to claim 1, wherein
executing the input bit movement instructions includes:
  executing an input bit rotation instruction that internally transmits an input bit stored on a first memory circuit to a second memory circuit of a target processing core, wherein the internal transmission of the input bit includes a rotation of the input bit from the first memory circuit to the second memory circuit that is between zero and three-hundred sixty degrees.

13. A method of configuring an array of processors of an integrated circuit, the method comprising:
  identifying a fast Fourier transform (FFT) matrix multiply of input data, wherein the FFT matrix multiply of the input data comprises a bit-reversed input array;
  configuring the array of processing cores based on the bit-reversed input array, wherein the configuring the array of processing cores includes:
    storing one or more of the input bits of the bit-reversed input array within memory circuits of distinct processing cores of an array of processing cores of the integrated circuit based on an input bit mapping that identifies a pre-determined storage location within the array of processing cores of each input bit of the bit-reversed input array; and
  at runtime, executing by the array of processing cores the FFT matrix multiply including performing a plurality of matrix multiply computations between a plurality of weight stages of the FFT matrix multiply and the input bits of the bit-reversed input array stored within the memory circuits of the distinct processing cores.

14. The method according to claim 13, further comprising:
  generating the input bit mapping of each of the input bits of the bit-reversed input array based on a bit-reversed input bit index that indexes, in a corresponding manner, a sequence of input bits of an input array and a rearranged sequence of the inputs bits that define the bit-reversed input array.

15. The method according to claim 13, further comprising:
  generating the input bit mapping includes assigning a sequence of input bits of the bit-reversed input array to a memory location within a sequence of processing cores of the array of processing cores, wherein each input bit of the bit-reversed input array is assigned sequentially along the sequence of processing cores.

16. The method according to claim 13, further comprising:
  computing input bit movement instructions for on-processing core movements of the input bits of the bit-reversed input array for the plurality of matrix multiply computations associated with each of the plurality of weight stages, wherein the input bit movement instructions define one or more automatic transmissions of the input bits of the bit-reversed input array between memory circuits of distinct pairs of processing cores within the array of processing cores.

* * * * *